United States Patent
Lee

(10) Patent No.: US 10,114,496 B2
(45) Date of Patent: Oct. 30, 2018

(54) APPARATUS FOR MEASURING COORDINATES AND CONTROL METHOD THEREOF

(71) Applicant: Samsung Electronics Co. Ltd., Suwon-si, Gyeonggi-do (KR)

(72) Inventor: Gi-Yong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1119 days.

(21) Appl. No.: 13/965,550

(22) Filed: Aug. 13, 2013

(65) Prior Publication Data

US 2014/0062965 A1   Mar. 6, 2014

(30) Foreign Application Priority Data

Aug. 28, 2012 (KR) .................. 10-2012-0094575

(51) Int. Cl.
  *G06F 3/041* (2006.01)
  *G06F 3/0488* (2013.01)
  *G06F 3/0354* (2013.01)

(52) U.S. Cl.
  CPC ........ *G06F 3/0416* (2013.01); *G06F 3/03545* (2013.01); *G06F 3/0488* (2013.01)

(58) Field of Classification Search
  CPC ............. G06F 3/04883; G06F 3/03545; G06F 3/0488; G06F 3/0416
  USPC ................................................ 345/173, 179
  See application file for complete search history.

(56) References Cited

U.S. PATENT DOCUMENTS

| | | | | |
|---|---|---|---|---|
| 5,768,616 A | * | 6/1998 | Teterwak | G06F 3/046 178/114 |
| 5,889,237 A | * | 3/1999 | Makinwa | G06F 3/03545 178/18.01 |
| 7,174,042 B1 | * | 2/2007 | Simmons | G06K 9/00402 345/169 |
| 7,259,752 B1 | | 8/2007 | Simmons | |
| 7,426,288 B2 | * | 9/2008 | Sakamoto | G06K 9/00154 382/119 |
| 7,751,623 B1 | * | 7/2010 | Simmons | G06K 9/00402 345/173 |
| 2003/0038788 A1 | | 2/2003 | Demartines et al. | |
| 2003/0072490 A1 | * | 4/2003 | Pettersson | G06K 9/222 382/186 |
| 2003/0179201 A1 | * | 9/2003 | Thacker | G06F 3/0481 345/441 |

(Continued)

FOREIGN PATENT DOCUMENTS

| | | |
|---|---|---|
| CN | 102043584 A | 5/2011 |
| CN | 102073454 A | 5/2011 |

(Continued)

*Primary Examiner* — Jose Soto Lopez
(74) *Attorney, Agent, or Firm* — Jefferson IP Law, LLP

(57) ABSTRACT

An apparatus for measuring coordinates of input from an input means and a control method thereof are provided. The control method includes displaying a user input interface and receiving a user input from the input means, detecting an increase in a distance between the input means and the apparatus for measuring the coordinates, determining whether a hover event is completed, based on the distance between the input means and the apparatus for measuring the coordinates, and displaying a result of recognizing the user input as text when the hover event is completed.

17 Claims, 5 Drawing Sheets

(56) References Cited

U.S. PATENT DOCUMENTS

| | | | |
|---|---|---|---|
| 2003/0214491 A1* | 11/2003 | Keely | G06F 3/0481 345/179 |
| 2004/0017375 A1* | 1/2004 | Lui | G06F 3/0488 345/581 |
| 2004/0140956 A1* | 7/2004 | Kushler | G06F 3/04883 345/168 |
| 2004/0239639 A1* | 12/2004 | Stavely | G06F 3/04883 345/173 |
| 2005/0099406 A1* | 5/2005 | Pettiross | G06F 3/0236 345/179 |
| 2005/0099407 A1* | 5/2005 | Pennington, II | G06F 3/04883 345/179 |
| 2005/0210402 A1* | 9/2005 | Gunn | G06F 3/0236 715/773 |
| 2006/0109252 A1* | 5/2006 | Kolmykov-Zotov | G06F 3/03545 345/173 |
| 2007/0128899 A1* | 6/2007 | Mayer | G06F 9/4406 439/152 |
| 2008/0168290 A1* | 7/2008 | Jobs | G06F 1/26 713/324 |
| 2008/0250012 A1* | 10/2008 | Hinckley | G06F 17/30864 |
| 2009/0058829 A1* | 3/2009 | Kim | G06F 3/016 345/173 |
| 2009/0265670 A1 | 10/2009 | Kim et al. | |
| 2010/0021022 A1* | 1/2010 | Pittel | G06F 3/03545 382/123 |
| 2010/0220078 A1* | 9/2010 | Zloter | G06F 3/0433 345/177 |
| 2012/0065914 A1* | 3/2012 | Kiyose | G06F 3/0304 702/95 |
| 2012/0069027 A1 | 3/2012 | Yamazaki et al. | |
| 2012/0102436 A1 | 4/2012 | Nurmi | |
| 2012/0127128 A1 | 5/2012 | Large et al. | |
| 2013/0097550 A1* | 4/2013 | Grossman | G06F 3/0488 715/779 |
| 2014/0104164 A1 | 4/2014 | Chen | |

FOREIGN PATENT DOCUMENTS

| | | |
|---|---|---|
| CN | 102301322 A | 12/2011 |
| CN | 102414648 A | 4/2012 |
| WO | 2007-050267 A2 | 5/2007 |

* cited by examiner

APPARATUS FOR MEASURING COORDINATES AND CONTROL METHOD THEREOF

PRIORITY

This application claims the benefit under 35 U.S.C. § 119(a) of a Korean patent application field on Aug. 28, 2012 in the Korean Intellectual Property Office and assigned Serial No. 10-2012-0094575, the entire disclosure of which is hereby incorporated by reference.

BACKGROUND OF THE INVENTION

1. Field of the Invention

The present invention relates to an apparatus for measuring coordinates of input on a coordinate display device. More particularly, the present invention relates to an apparatus and method for measuring coordinates and for determining a time point of completion of input based on whether a hover event is completed.

2. Description of the Related Art

Recently, a market related to smart phones or touch screens has quickly grown, and accordingly, research on the smart phones or touch screens is also being actively conducted. In order to input a particular command in relation to a smart phone or a touch screen, a user can input a particular command or can designate a particular icon in such a manner as to designate a particular position on a display by using a part of the user's body or an ElectroMagnetic Resonance (EMR) pen.

A scheme in which a part of the user's body touches the surface of a touch screen may be implemented by using a touch screen of a capacitive type. Typically, a touch screen of the capacitive type includes transparent electrodes and a capacitive element between transparent electrodes. The user touches the surface of the touch screen by using the part of the user's body, and the touch of the part of the user's body may be sensed based on a capacitance of the capacitive element. The capacitance of the capacitive element changes according to the touch of the part of the user's body on the surface of the touch screen.

Meanwhile, in the touch screen of the capacitive type, the user touches the touch screen by using the part of the user's body. The touch screen of the capacitive type has a problem in that a relatively large touch area thereof makes precise input difficult to perform. In contrast, a touch screen of an Electromagnetic Resonance (EMR) type has an advantage in that the touch screen of an EMR type can operate even in the case of a small touch area.

In the touch screen of the EMR type, a loop coil is disposed on a circuit board, and a control operation is performed so as to apply a voltage to the loop coil and generate an electromagnetic field. Then, a control operation is performed so that the generated electromagnetic field may be delivered to an EMR pen. The EMR pen may include a capacitor and a loop, and can again emit the electromagnetic field delivered thereto as an electromagnetic field having a predetermined frequency component.

The electromagnetic field emitted by the EMR pen can again be delivered to the loop coil of the circuit board. Accordingly, a determination can be made as to a position to which the EMR pen is close in relation to the surface of the touch screen. An apparatus which measures coordinates in the EMR scheme as described above may identify the existence of the pen even when the pen does not directly touch the touch screen.

Meanwhile, an apparatus according to the related art for measuring coordinates adopts a configuration of performing text conversion based on the input of the pen. For example, the apparatus according to the related art for measuring coordinates adopts a configuration of recognizing input using the pen of the user as characters and interpreting the input as character data. Accordingly, the apparatus according to the related art for measuring coordinates can convert handwriting, which the user inputs, into character data.

When the pen does not touch the apparatus according to the related art for measuring coordinates for a predetermined time period or more, the apparatus according to the related art for measuring coordinates performs text recognition on the content that the user has input. Accordingly, the user is inconvenienced in that the user must continuously perform input using the pen in order to input desired content. Namely, the user is inconvenienced in that the user must continuously perform input without hesitation in order to prevent text recognition from being performed before completion of the input of content desired by the user.

Therefore, a need exists for an apparatus and method for determining a time point of completion of input based on whether a hover event is completed.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus for measuring coordinates and a control method thereof, which can determine a time point of completion of input based on whether a hover event is completed.

In accordance with an aspect of the present invention, a control method of an apparatus for measuring coordinates is provided. The control method includes displaying a user input interface and receiving a user input from the input means, detecting an increase in a distance between the input means and the apparatus for measuring the coordinates, determining whether a hover event is completed based on the distance between the input means and the apparatus for measuring the coordinates, and displaying a result of recognizing the user input as text when the hover event is completed.

In accordance with another aspect of the present invention, an apparatus for measuring coordinates of an input by an input means is provided. The apparatus includes a touch screen for displaying a user input interface and receiving a user input from the input means, and a controller for performing a control operation so as to detect an increase in a distance between the input means and the apparatus for measuring the coordinates, for determining whether a hover event is completed based on the distance between the input means and the apparatus for measuring the coordinates, and for performing a control operation so as to display a result of recognizing the user input as text when the hover event is completed.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the terms including ordinal numbers such as first and second may be used herein to describe various elements, these elements should not be limited by these terms. These terms are only used to distinguish one element from another. For example, a first element could be termed a second element, and similarly, a second element could be termed a first element, without departing from the scope of right of the present invention. The terminology used herein is for the purpose of describing particular exemplary embodiments only, and is not intended to limit the present invention. As used herein, the singular forms "a," "an" and "the" are intended to include the plural forms as well, unless the context clearly indicates otherwise.

Figure 1:
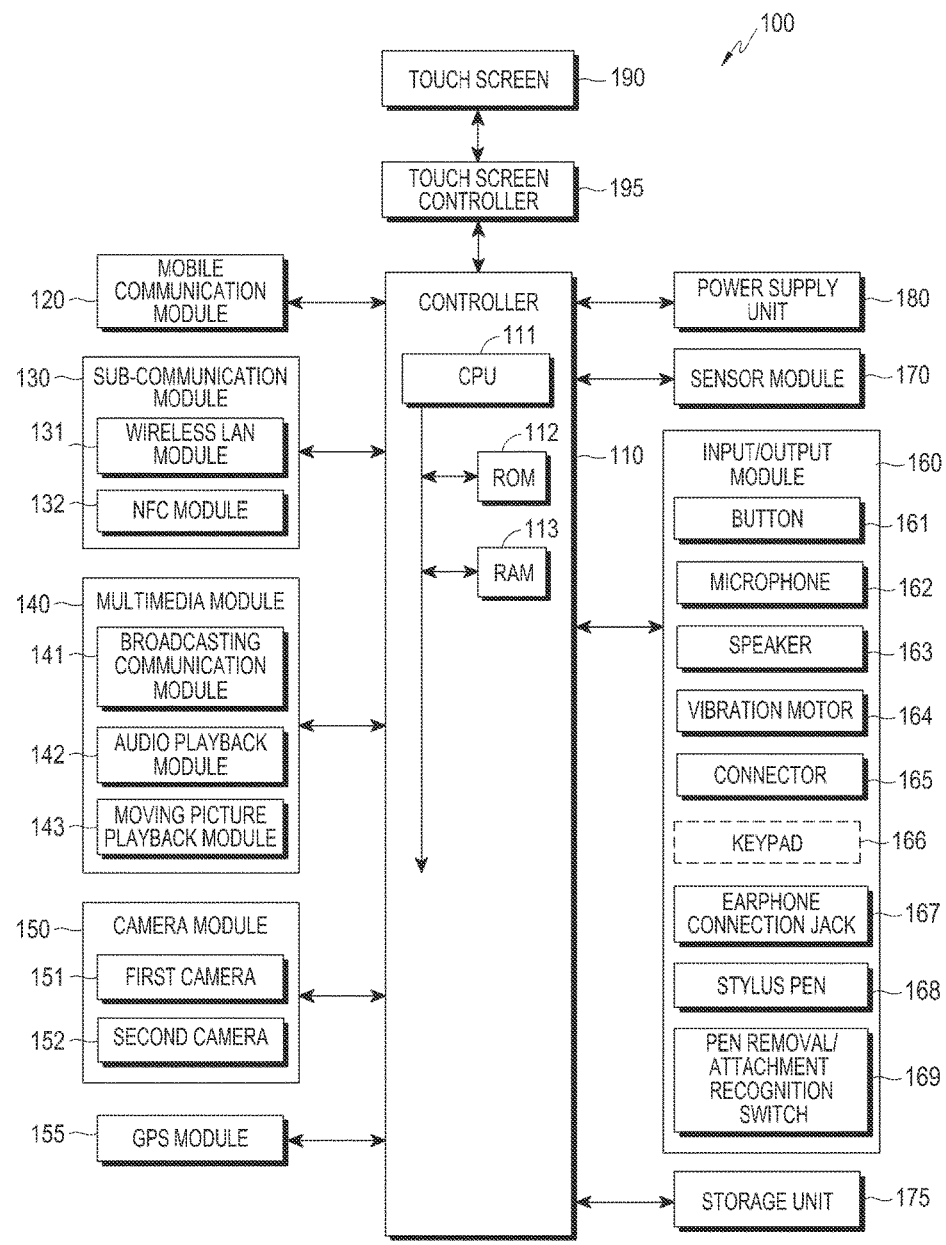
FIG. 1 is a block diagram schematically showing a configuration of a mobile device according to an exemplary embodiment of the present invention.

FIG. 1 is a block diagram schematically showing a configuration of a mobile device according to an exemplary embodiment of the present invention.

Referring to FIG. 1, the mobile device 100 includes a controller 110, a mobile communication module 120, a sub-communication module 130, a multimedia module 140, a camera module 150, a Global Positioning System (GPS) module 155, an Input/Output (I/O) module 160, a sensor module 170, a storage unit 175, a power supply unit 180, a touch screen 190, and a touch screen controller 195.

According to exemplary embodiments of the present invention, a mobile device 100 may be connected to an external device (not shown) by using an external device connection unit, such as the sub-communication module 130, a connector 165, an earphone connection jack 167, and the like. The external devices may include various devices, such as an earphone, an external speaker, a Universal Serial Bus (USB) memory, a charger, a cradle/dock, a Digital Multimedia Broadcasting (DMB) antenna, a device related to mobile payment, a health care device (e.g., a blood glucose meter or the like), a video game console, and a car navigation device, each of which may be removed or detached from/to the mobile device 100 and may be connected to the mobile device 100 by a wire. Also, the external devices may include short-range communication devices such as a Bluetooth communication device and a Near Field Communication (NFC) device each of which may be wirelessly connected to the mobile device 100 through short-range communication, a Wi-Fi direct communication device, a wireless Access Point (AP), and the like. Also, the external devices may include another device, a mobile phone, a smart phone, a tablet Personal Computer (PC), a desktop PC, a server, and the like.

According to exemplary embodiment of the present invention, the sub-communication module 130 includes at least one of a wireless LAN module 131 and a short-range communication module 132 (e.g., an NFC communication module). For example, the sub-communication module 130 may include only the wireless LAN module 131, or may include only the short-range communication module 132, or may include both the wireless Local Area Network (LAN) module 131 and the short-range communication module 132.

According to exemplary embodiment of the present invention, the multimedia module 140 includes at least one of a broadcasting communication module 141, an audio reproduction module 142, and a moving image reproduction module 143.

According to exemplary embodiment of the present invention, the camera module 150 includes at least one of a first camera 151 and a second camera 152.

According to exemplary embodiment of the present invention, the input/output module 160 includes at least one of buttons 161, a microphone 162, a speaker 163, a vibration motor 164, the connector 165 and a keypad 166. The input/output module 160 may include an earphone jack 167, a stylus pen 168, a pen removal/attachment recognition switch 169, and the like.

Hereinafter, a case will be described as an example in which the display unit 190 and the display controller 195 are a touch screen and a touch screen controller, respectively.

The controller 110 may include a Central Processing Unit (CPU) 111, a Read Only Memory (ROM) 112 which stores a control program for controlling the mobile device 100, and a Random Access Memory (RAM) 113 which stores a signal or data received from the outside of the mobile device 100, or which is used as a memory area for a task performed by the mobile device 100. The CPU 111 may include a number of processors. For example, the CPU 111 may include a single-core processor, a dual-core processor, a triple-core processor, a quad-core processor, or the like. The CPU 111, the ROM 112 and the RAM 113 may be interconnected by an internal bus.

The controller 110 may control the mobile communication module 120, the sub-communication module 130, the multimedia module 140, the camera module 150, the GPS module 155, the input/output module 160, the sensor module 170, the storage unit 175, the power supply unit 180, the touch screen 190, and the touch screen controller 195.

According to the control of the controller 110, the mobile communication module 120 allows the mobile device 100 to be connected to an external device through mobile communication by using at least one antenna or multiple antennas (not shown). The mobile communication module 120 transmits and receives a wireless signal for a voice call, a video call, a Short Message Service (SMS), a Multimedia Messaging Service (MMS), or the like to/from a mobile phone (not shown), a smart phone (not shown), a tablet PC or another device (not shown), which has a telephone number which is input to the mobile device 100.

According to the control of the controller 110, the wireless LAN module 131 may be connected to the Internet at a place where a wireless AP (not shown) is installed. The wireless LAN module 131 supports a wireless LAN standard (e.g., IEEE802.11x of Institute of Electrical and Electronics Engineers (IEEE)). According to the control of the controller 110, the short-range communication module 132 enables the mobile device 100 to perform wireless short-range communication with an image forming device (not shown). Short-range communication schemes may include Bluetooth, Infrared Data Association (IrDA), Wi-Fi direct communication, NFC, and the like.

According to performance, the mobile device 100 may include at least one of the mobile communication module 120, the wireless LAN module 131 and the short-range communication module 132. For example, according to performance, the mobile device 100 may include a combination of the mobile communication module 120, the wireless LAN module 131 and the short-range communication module 132.

The multimedia module 140 may include the broadcasting communication module 141, the audio reproduction module 142, or a moving image reproduction module 143. According to the control of the controller 110, the broadcasting communication module 141 may receive a broadcast signal (e.g., a TV broadcast signal, a radio broadcast signal, a data broadcast signal, and the like) and broadcast additional information (e.g., an Electronic Program Guide (EPS) or an Electronic Service Guide (ESG)), which is transmitted by a broadcast station through a broadcast communication antenna (not shown). According to the control of the controller 110, the audio reproduction module 142 may reproduce a stored or received digital audio file (e.g., a file having a file extension of mp3, wma, ogg, way, and the like). According to the control of the controller 110, the moving image reproduction module 143 may reproduce a stored or received digital moving image file (e.g., a file having a file extension of mpeg, mpg, mp4, avi, mov, mkv, and the like). The moving image reproduction module 143 may reproduce a digital audio file.

The multimedia module 140 may exclude the broadcasting communication module 141, and may include the audio reproduction module 142 and the moving image reproduction module 143. Also, the audio reproduction module 142 or the moving image reproduction module 143 of the multimedia module 140 may be included in the controller 110.

The camera module 150 may include at least one of the first camera 151 and the second camera 152, each for capturing a still image or a moving image according to the control of the controller 110. Also, the first camera 151 or the second camera 152 may include an auxiliary light source, such as a flash (not shown), which provides the amount of light required to capture an image. The first camera 151 may be mounted on a front surface of the mobile device 100, and the second camera 152 may be mounted on a rear surface of the mobile device 100. Otherwise, the first camera 151 and the second camera 152 may be disposed in such a manner as to be adjacent to each other (e.g., a distance between the first camera 151 and the second camera 152 is greater than 1 cm and is less than 8 cm), and may capture a three-dimensional still image or a three-dimensional moving image.

The GPS module 155 receives a signal (e.g., a radio wave) from each of multiple GPS satellites (not shown) in the Earth's orbit, and the GPS module 155 may calculate a location of the mobile device 100 by using a Time of Arrival (TOA) from each of the GPS satellites (not shown) to the mobile device 100.

The input/output module 160 may include at least one of the multiple buttons 161, the microphone 162, the speaker 163, the vibration motor 164, the connector 165 and the keypad 166.

The buttons 161 may be formed on a front surface, a lateral surface or a rear surface of a housing of the mobile device 100, and may include at least one of a power/lock button (not shown), a volume button (not shown), a menu button, a home button, a back button and a search button.

According to the control of the controller 110, the microphone 162 receives a voice or sound as input, and generates an electrical signal.

According to the control of the controller 110, the speaker 163 may output sounds matched to various signals (e.g., a wireless signal, a broadcast signal, a digital audio file, a digital moving image file, and photographing) from the mobile communication module 120, the sub-communication module 130, the multimedia module 140 and the camera module 150, to the outside of the mobile device 100. The speaker 163 may output a sound (e.g., a button operation sound or a ring back tone matched to a telephone call) matched to a function that the mobile device 100 performs. The mobile device 100 may include multiple speakers. The speaker 163 or multiple speakers may be disposed at an appropriate position or appropriate positions of the housing of the mobile device 100.

According to the control of the controller 110, the vibration motor 164 may convert an electrical signal into a mechanical vibration. For example, when the mobile device 100 in a vibration mode receives a voice call from another device (not shown), the vibration motor 164 of the mobile device 100 operates. The mobile device 100 may include multiple vibration motors. The one vibration motor 164 or the multiple vibration motors may be mounted within the housing of the mobile device 100. The vibration motor 164 may operate in response to a touch action of a user who touches the touch screen 190 and a continuous movement of a touch on the touch screen 190.

The connector 165 may be used as an interface for connecting the mobile device 100 to an external device (not shown) or a power source (not shown). According to the control of the controller 110, through a wired cable connected to the connector 165, the mobile device 100 may transmit data stored in the storage unit 175 of the mobile device 100 to an external device (not shown) or may receive data from the external device (not shown). Also, through the wired cable connected to the connector 165, the mobile device 100 may receive power from the power source (not shown) or may charge a battery (not shown) by using the power source.

The keypad 166 may receive key input from the user in order to control the mobile device 100. The keypad 166 includes a physical keypad (not shown) installed on the front surface of the mobile device 100 or a virtual keypad (not shown) displayed on the touch screen 190. The physical keypad (not shown) installed on the front surface of the mobile device 100 may be excluded according to the performance or structure of the communication device 100.

A plug of an earphone (not shown) may be inserted into the earphone connection jack 167, and the earphone may be connected to the mobile device 100.

The sensor module 170 includes at least one sensor for detecting the state of the mobile device 100. For example, the sensor module 170 may include a proximity sensor for detecting whether the user is close to the mobile device 100, an illuminance sensor (not shown) for detecting the amount of light around the mobile device 100, a motion sensor (not shown) for detecting the motion of the mobile device 100 (e.g., the rotation of the mobile device 100, or acceleration or vibration applied to the mobile device 100), a geomagnetic sensor (not shown) for detecting a point of the compass by using the Earth's magnetic field, a gravity sensor for detecting the working direction of gravity, an altimeter for measuring atmospheric pressure and detecting an altitude, and the like. At least one sensor may detect the state of the communication device 100, may generate a signal matched to the detection, and may transmit the generated signal to the controller 110. According to the performance of the mobile device 100, sensors may be added to or removed from the sensor module 170.

According to the control of the controller 110, the storage unit 175 may store a signal or data which is input/output in response to an operation of each of the mobile communication module 120, the sub-communication module 130, the multimedia module 140, the camera module 150, the GPS module 155, the input/output module 160, the sensor module 170, and the touch screen 190. The storage unit 175 may store a control program for controlling the mobile device 100 or a control program for the controller 110, and applications.

The term "storage unit" includes the storage unit 175, the ROM 112 and the RAM 113 within the controller 110, or a memory card (not shown), such as a Secure Digital (SD) card or a memory stick, which is mounted on the mobile device 100. The storage unit may include a non-volatile memory, a volatile memory, a Hard Disk Drive (HDD), a Solid State Drive (SSD), and the like.

According to the control of the controller 110, the power supply unit 180 may supply power to one battery or multiple batteries (not shown) disposed in the housing of the mobile device 100. The one battery or the multiple batteries (not shown) supply power to the mobile device 100. Also, the power supply unit 180 may supply power provided by an external power source (not shown) to the mobile device 100 through a wired cable connected to the connector 165. Also, the power supply unit 180 may supply power, which is wirelessly provided by an external power source, to the mobile device 100 by using a wireless charging technology.

The touch screen 190 may provide the user with a user interface matched to various services (e.g., telephone call, data transmission, broadcasting, and photography). The touch screen 190 may transmit an analog signal matched to at least one touch, which is input to the user interface, to the touch screen controller 195. The touch screen 190 may receive at least one touch as input from the user's body (e.g., fingers, thumbs, and the like) or an input means (e.g., a stylus pen, and the like) enabling a touch. Also, the touch screen 190 may receive, as input, a continuous movement of one touch with respect to at least one touch. The touch screen 190 may transmit an analog signal matched to a continuous movement of an input touch, to the touch screen controller 195.

Further, according to exemplary embodiments of the present invention, a touch is not limited to the touch of the user's body or the input means enabling a touch on the touch screen 190, but may include a non-contact touch (e.g., a detectable distance between the touch screen 190 and the user's body or the input means enabling a touch is equal to or less than 1 mm). In the touch screen 190, a detectable distance may change depending on the performance or structure of the mobile device 100. Particularly, in order to enable the detection of both a touch event due to the touch of the user's body or the input means enabling a touch on the touch screen 190 and an event of input in a non-contact state (e.g., hovering) in such a manner so as to distinguish the touch event from the hovering event, the touch screen 190 is configured in such a manner that the touch screen 190 may output different values (e.g., current values) detected during the touch event and detected during the hovering event. Further, it is desirable that the touch screen 190 outputs different detected values (e.g., current values) according to a distance between space, in which the hovering event occurs, and the touch screen 190.

The touch screen 190, for example, may be implemented as a resistive touch screen, a capacitive touch screen, an infrared touch screen, an acoustic wave touch screen, and/or the like.

Meanwhile, the touch screen controller 195 converts an analog signal received from the touch screen 190 into a digital signal (e.g., X and Y coordinates), and provides the digital signal to the controller 110. The controller 110 may control the touch screen 190 by using the digital signal received from the touch screen controller 195. For example, in response to a touch event or a hovering event, the controller 110 enables a shortcut icon (not shown) displayed on the touch screen 190 to be selected, or enables the shortcut icon (not shown) to be executed. Also, the touch screen controller 195 may be included in the controller 110.

Further, the touch screen controller 195 may detect a value (e.g., a current value) which is output from the touch screen 190, and may identify a distance between a space in which the hovering event occurs, and the touch screen 190. Also, the touch screen controller 195 may convert the value of the identified distance into a digital signal (e.g., a Z coordinate), and may provide the digital signal to the controller 110.

Also, in order to enable the touch screen 190 to simultaneously receive input from the user's body and input from the input means enabling a touch, the touch screen 190 may include at least two touch screen panels which may sense the touch or proximity of the user's body and the input means enabling a touch, respectively. The at least two touch screen panels provide different output values to the touch screen controller 195, and the touch screen controller 195 recognizes the values received from the at least two touch screen panels as different values. Accordingly, the touch screen controller 195 may determine whether input from the touch screen is input from the user's body, or whether the input from the touch screen is input from the input means enabling a touch.

The touch screen 190, for example, may include a coil electrode unit for measuring a position, which includes at least one loop coil capable of receiving an Electro Magnetic Resonance (EMR) signal as input. During a first time period, the coil electrode unit for measuring a position transmits a transmission signal (Tx signal) to an EMR pen. The transmitted Tx signal may be absorbed by the EMR pen. During a second time period, the EMR pen transmits a reception signal (Rx signal) to the mobile device 100 based on the absorbed transmission signal. The mobile device 100 may recognize coordinates of input from the EMR pen based on the Rx signal received from the EMR pen. Particularly, a mobile device 100 may recognize the placement of the EMR pen even when the EMR pen does not directly touch the touch screen. Otherwise, the mobile device 100 may recognize the placement of a part of the user's body.

Accordingly, the controller 110 may measure the placement of the EMR pen and the like near the mobile device 100. Also, the controller 110 may measure the withdrawal of the EMR pen from the mobile device 100. For example, when the strength of an Rx signal received from the EMR pen is less than a preset threshold, the controller 110 may determine that the EMR pen is withdrawn from the mobile device 100. Otherwise, when the strength of the Rx signal received from the EMR pen is greater than the preset threshold, the controller 110 may determine that the EMR pen is placed near the mobile device 100.

The controller 110 may determine that the placement of the EMR pen near the mobile device 100 corresponds to a case in which a hovering event is occurring. Also, the controller 110 may determine that taking the EMR pen off the mobile device 100 (e.g., moving the EMR pen away from the mobile device 100) corresponds to the completion of the hovering event.

Figure 2:
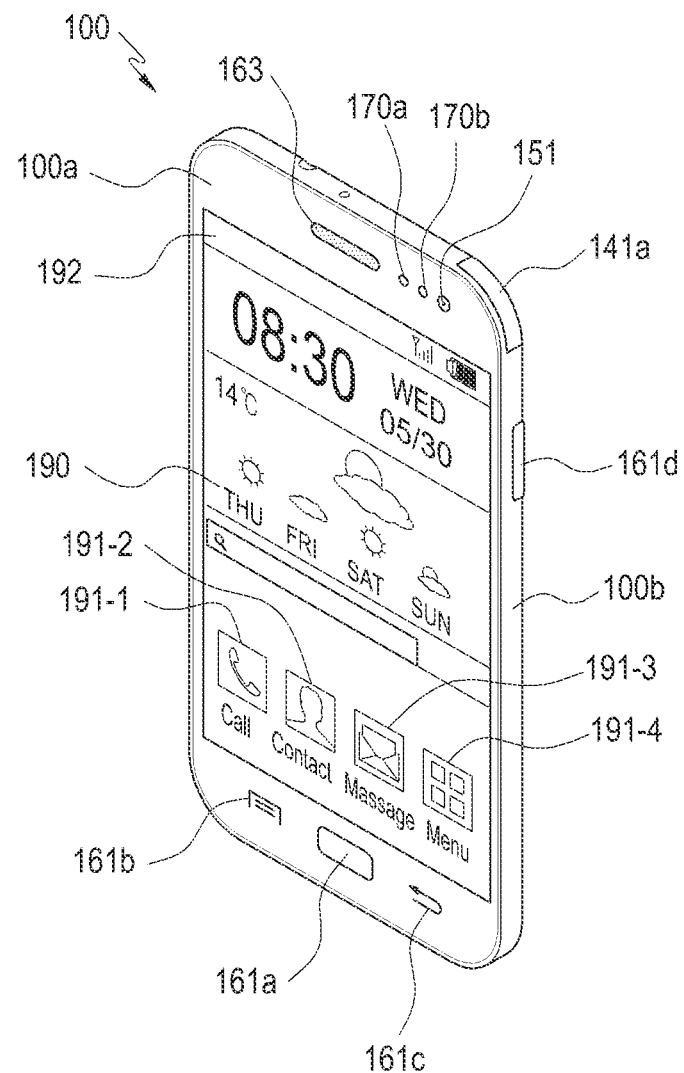
FIG. 2 is a front perspective view of a mobile device according to an exemplary embodiment of the present invention.
Figure 3:
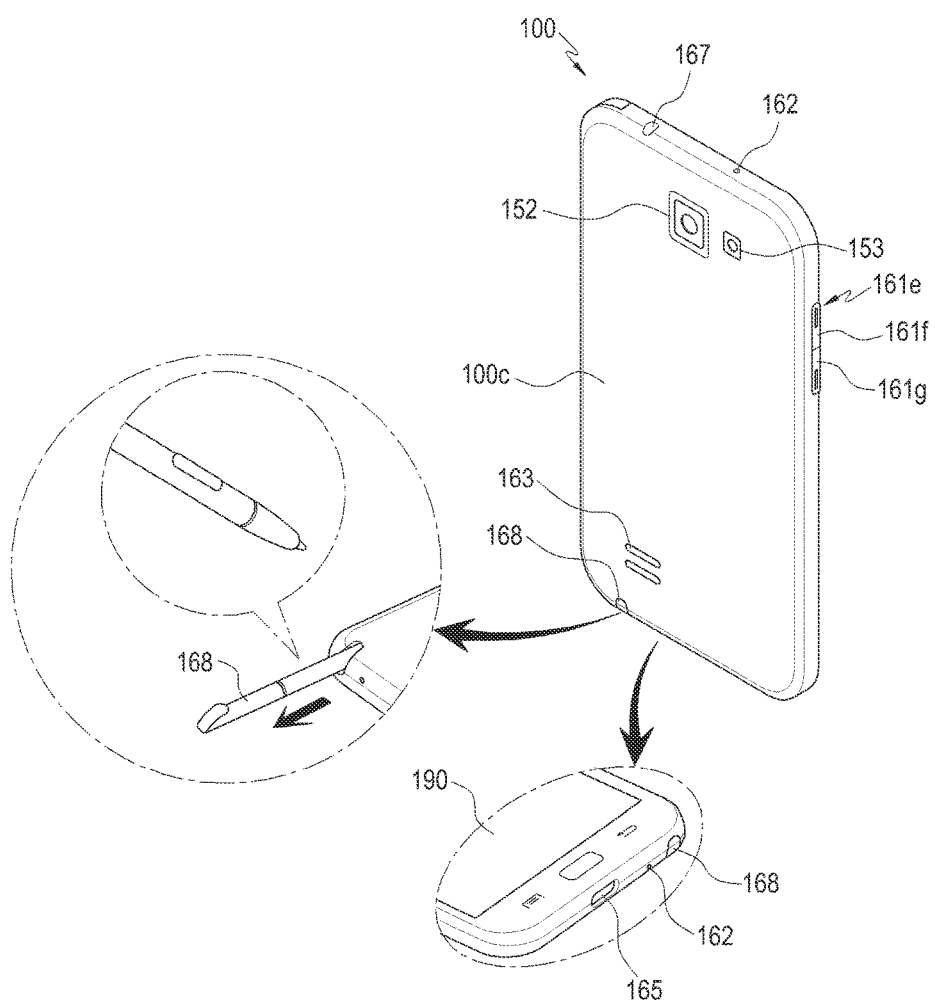
FIG. 3 is a rear perspective view of a mobile device according to an exemplary embodiment of the present invention.

FIG. 2 is a front perspective view of a mobile device according to an exemplary embodiment of the present invention. FIG. 3 is a rear perspective view of a mobile device according to an exemplary embodiment of the present invention.

Referring to FIGS. 2 and 3, the touch screen 190 is disposed in the center of a front surface 100a of the mobile device 100. The touch screen 190 is largely formed so as to occupy most of the front surface 100a of the mobile device 100. FIG. 2 shows an example of displaying a main home screen on the touch screen 190. The main home screen is the first screen displayed on the touch screen 190 when the mobile device 100 is turned on. Also, when the mobile device 100 has different home screens having multiple pages, the main home screen may be the first home screen among the multi-page home screens. On the home screen, shortcut icons 191-1, 191-2 and 191-3 for executing frequently-used applications, a main menu shift key 191-4, time, weather and the like may be displayed. The main menu shift key 191-4 displays a menu screen on the touch screen 190. Also, a status bar 192 which displays the states of the mobile device 100, such as the state of battery charging, the strength of a received signal, current time, and the like, may be formed in an upper end part of the touch screen 190.

A home button 161a, a menu button 161b and a back button 161c may be formed in a lower part of the touch screen 190.

The home button 161a is used to display the main home screen on the touch screen 190. For example, the main home screen may be displayed on the touch screen 190 when the home button 161a is touched in a state of displaying a home screen (any home screen) different from the main home screen or the menu screen on the touch screen 190. Also, when the home button 161a is touched on the touch screen 190 during execution of applications, the main home screen shown in FIG. 2 may be displayed on the touch screen 190. Also, the home button 161a may be used to display recently-used applications on the touch screen 190 or may be used to display a task manager.

The menu button 161b provides a connection menu which may be used on the touch screen 190. The connection menu may include a widget addition menu, a background screen change menu, a search menu, an edit menu, an environment setting menu, and the like.

The back button 161c may be used to display a screen executed just before a currently-executed screen, or may be used to terminate the most recently used application.

The first camera 151, an illuminance sensor 170a and a proximity sensor 170b may be disposed at the edge of the front surface 100a of the mobile device 100. A second camera 152, a flash 153 and a speaker 163 may be disposed on a rear surface 100c of the mobile device 100.

On a lateral surface 100b of the mobile device 100, for example, a power/reset button 160a, a speaker phone button 161d, a terrestrial DMB antenna 141a for receiving broadcast signals, one or multiple microphones 162 and the like may be disposed. The DMB antenna 141a may be formed so as to be fixed to the mobile device 100, or so as to be removable or detachable from/to it.

A volume control 161f may be disposed on another lateral surface of the mobile device 100. The volume control 161f may include a volume increase button 161e and a volume decrease button 161g.

Also, the connector 165 is formed on a lateral surface of a lower end of the mobile device 100. The connector 165 includes multiple electrodes, and may be used to connect the mobile device 100 to an external device by a wire. The earphone connection jack 167 may be formed on a lateral surface of an upper end of the mobile device 100. A plug of an earphone may be inserted into the earphone connection jack 167.

Further, the controller 110 included in the mobile device according to an exemplary embodiment of the present invention as described above is configured so that the controller 110 may perform a method for controlling scrolling according to an exemplary embodiment of the present invention. To this end, the controller 110 according to exemplary embodiments of the present invention may collect (e.g., detect) a hovering event, as illustrated in FIG. 4.

Figure 4:
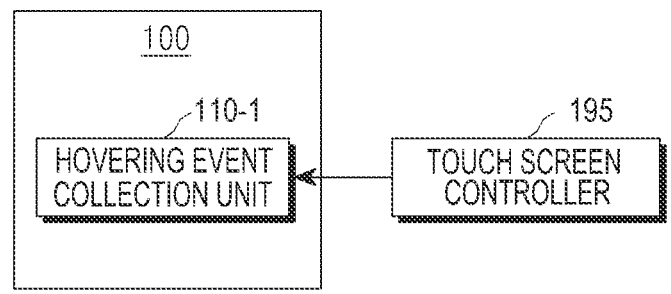
FIG. 4 is a block diagram showing a specific configuration of a controller of a mobile device, to which a method for controlling scrolling is applied, according to an exemplary embodiment of the present invention.

FIG. 4 is a block diagram showing a specific configuration of a controller of a mobile device, to which a method for controlling scrolling is applied, according to an exemplary embodiment of the present invention.

Referring to FIG. 4, the controller 100 includes a hovering collection unit 110-1 which may communicate with the touch screen controller 195.

The hovering event collection unit 110-1 may identify whether a hovering event has occurred on the touch screen, by using a digital signal (e.g., X, Y and Z coordinates) provided by the touch screen controller 195; may detect an area over which the hovering event has occurred, based on X and Y coordinates; and may also detect a distance between the touch screen 190 and the user's body or the input means enabling a touch based on a Z coordinate. Further, the hovering event collection unit 110-1 may count a time period, during which the hovering event lasts, in the area over which the hovering event has occurred.

Also, the hovering event collection unit 110-1 may control performing of text recognition on input content by using information on the area where the collected hovering event has occurred. Namely, the hovering event collection unit 110-1 may determine a time point of occurrence of a hovering event and a time point of completion of a hovering event. While the hovering event lasts (e.g., is maintained), the controller 110 may perform a control operation so as to prevent text recognition from being performed. In contrast, when the hovering event is completed, the controller 110 may perform a control operation so as to perform the text recognition.

Figure 5:
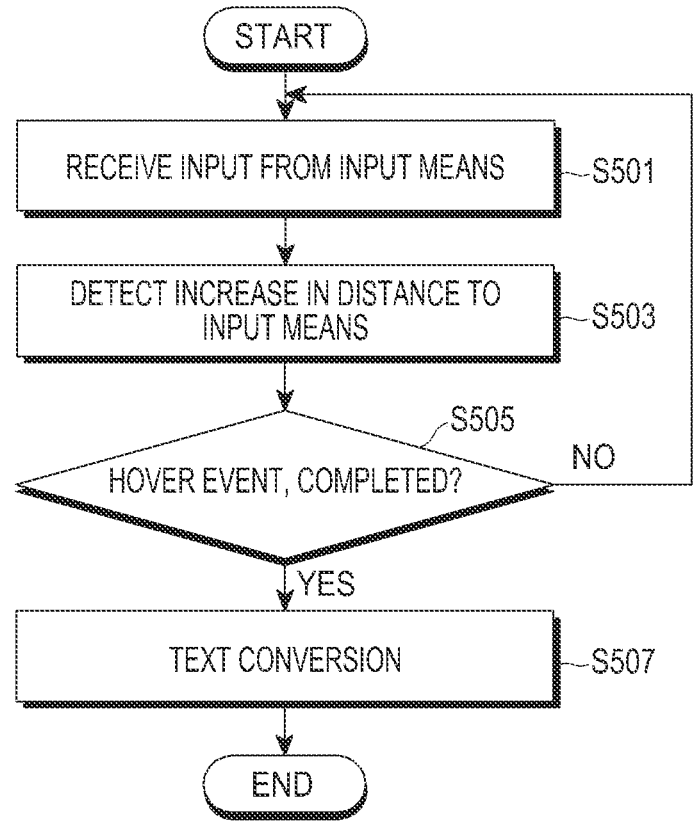
FIG. 5 is a flowchart showing a control method of an apparatus for measuring coordinates according to an exemplary embodiment of the present invention.

FIG. 5 is a flowchart showing a control method of an apparatus for measuring coordinates according to an exemplary embodiment of the present invention.

Referring to FIG. 5, the apparatus for measuring coordinates may provide a user input interface, and may receive user input from an input means, such as an EMR pen or a finger, matched to the user input interface in step S501. For example, a user may touch a point on the touch screen of the apparatus for measuring coordinates, and the apparatus for measuring coordinates may determine the point that the input means touches on the touch screen.

Meanwhile, the apparatus for measuring coordinates may detect an increase in a distance between the input means and the apparatus for measuring coordinates in step S503. For example, the apparatus for measuring coordinates may detect an increase in the distance between the input means and the apparatus for measuring coordinates, from a reduction in the strength of an Rx signal received from the input means. Otherwise, the apparatus for measuring coordinates may detect an increase in the distance between the input means and the apparatus for measuring coordinates, based on a Z coordinate. As another example, the apparatus may detect a change in the distance between the input means and the apparatus for measuring coordinates. The apparatus may monitor a distance between the input means and the apparatus for measuring coordinates.

Then, the apparatus for measuring coordinates may determine whether a hover event is completed in step S505. For example, the apparatus for measuring coordinates may determine whether the distance between the input means and the apparatus for measuring coordinates exceeds a preset length. The preset length can be referred to as, for example, a "hover event height." The apparatus for measuring coordinates may determine the distance between the apparatus for measuring coordinates and the input means, which exceeds a hover event height, as the completion of the hover event.

When the apparatus determines that the hover event is completed in step S505, the apparatus proceeds to step S507 in which the apparatus for measuring coordinates may recognize the contents of input writing, as text, and may convert the contents of the input writing into text.

In contrast, when the apparatus determines that that the hover event is not completed in step S505, the apparatus for measuring coordinates does not perform text recognition on the contents of the input writing. When the result of the determination in step S505 shows that the hover event is not completed, the apparatus for measuring coordinates may continuously receive user input. Accordingly, the user may complete the writing at a time point desired by the user. As an example, the apparatus may proceed to step S501.

Figure 6:
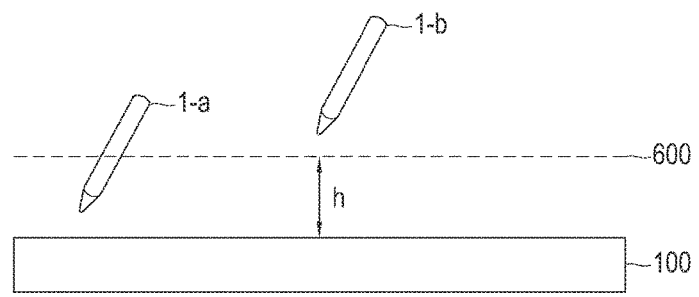
FIG. 6 is a conceptual view for explaining a completion of a hover event according to an exemplary embodiment of the present invention.

FIG. 6 is a conceptual view for explaining a completion of a hover event according to an exemplary embodiment of the present invention.

Referring to FIG. 6, the mobile device 100 recognizes a hover event height 600 having a preset length h. When the input means is placed at a position below the hover event height 600 as shown by reference numeral 1-a, the mobile device 100 recognizes that a hovering event is occurring. Accordingly, the mobile device 100 may avoid performing text recognition on the contents of input writing. Otherwise, while the mobile device 100 performs text recognition on the contents of the input writing, the mobile device 100 may perform a control operation so as to prevent performing of the text recognition from being displayed. When the hover event has been completed, the mobile device 100 may display a result of performing the text recognition, all together.

When the input means is placed at a position above the hover event height 600 as shown by reference numeral 1-b, a mobile device 100 recognizes that the hover event is completed. Accordingly, the mobile device 100 performs text recognition on the contents of input writing. Otherwise, the mobile device 100 may display a result of performing the text recognition, all together.

However, even when the input means is placed at a position below the hover event height 600 as shown by reference numeral 1-a, if input does not occur until a preset time period is exceeded, the mobile device 100 may determine that a hover event is completed.

Figure 7:
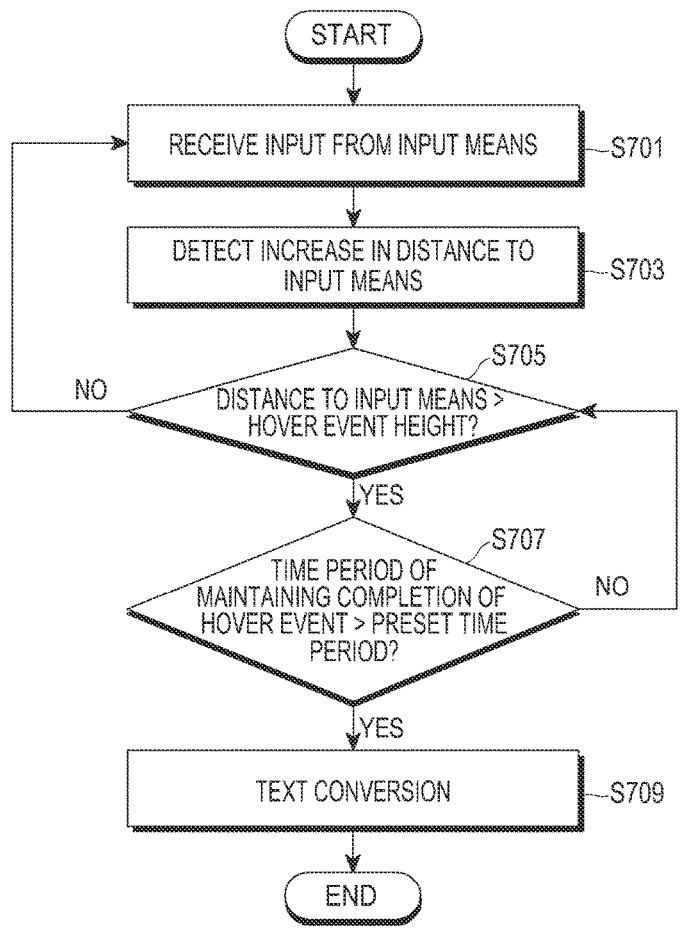
FIG. 7 is a flowchart showing a control method of an apparatus for measuring coordinates according to an exemplary embodiment of the present invention.

FIG. 7 is a flowchart showing a control method of an apparatus for measuring coordinates according to an exemplary embodiment of the present invention.

Referring to FIG. 7, the apparatus for measuring coordinates may receive input from an input means such as an EMR pen or a finger in step S701. For example, a user may touch a point on the touch screen of the apparatus for measuring coordinates, and the apparatus for measuring coordinates may determine the point that the input means touches on the touch screen.

Meanwhile, the apparatus for measuring coordinates may detect an increase in a distance between the input means and the apparatus for measuring coordinates in step S703. For example, the apparatus for measuring coordinates may detect an increase in the distance between the input means and the apparatus for measuring coordinates, from a reduction in the strength of an Rx signal received from the input means. Otherwise, the apparatus for measuring coordinates may detect an increase in the distance between the input means and the apparatus for measuring coordinates, based on a Z coordinate.

The apparatus for measuring coordinates may determine whether the distance between the input means and the apparatus for measuring coordinates exceeds a hover event height in step S705. For example, when the strength of an Rx signal received from the input means is less than a preset magnitude, the apparatus for measuring coordinates may determine that the distance between the input means and the apparatus for measuring coordinates exceeds the hover event height.

When the apparatus determines that the distance between the input means and the apparatus for measuring coordinates is equal to or less than the hover event height in step S705, the apparatus for measuring coordinates may avoid performing text recognition on the contents of input writing. Otherwise, while the apparatus for measuring coordinates performs the text recognition on the contents of the input writing in real time, the apparatus may prevent a result of performing the text recognition from being displayed. In this case, the apparatus for measuring coordinates may continuously receive the user input while it does not display the result of performing the text recognition. Namely, the apparatus for measuring coordinates may provide a user input interface. For example, the apparatus may proceed to step S701.

When the apparatus determines that the distance between the input means and the apparatus for measuring coordinates is greater than the hover event height in step S705, the apparatus proceeds to step S707 in which the apparatus for measuring coordinates may determine that a hover event is completed.

The apparatus for measuring coordinates determines whether a time period of maintaining the completion of the hover event exceeds a preset time period in step S707. When the apparatus for measuring coordinates determines that the time period of maintaining the completion of the hover event is equal to or less than the preset time period in step S707, the apparatus for measuring coordinates determines that the hover event is not completed. For example, the apparatus for measuring coordinates may return to step S705.

In contrast, when the apparatus for measuring coordinates determines that the time period of maintaining the completion of the hover event exceeds the preset time period in step S707, the apparatus for measuring coordinates may determine that the hover event is completed.

Accordingly, the apparatus for measuring coordinates may perform the text recognition on the contents of the input writing in step S709. Otherwise, the apparatus for measuring coordinates may display a result of performing the text recognition, all together.

As described above, when the input means is not placed at a position above the hover event height, the apparatus for measuring coordinates continuously provides a user input interface. The user performs writing by using the pen in a state of maintaining the pen at a position having a height equal to or less than the hover event height, and thereby may be provided with the user input interface.

It will be appreciated that the exemplary embodiments of the present invention may be implemented in the form of hardware, software, or a combination of hardware and software. Any such software may be stored in a volatile or non-volatile storage device such as a ROM, or in a memory such as a RAM, a memory chip, a memory device or a memory integrated circuit, or in a storage medium, such as a Compact Disc (CD), a Digital Versatile Disc (DVD), a magnetic disk or a magnetic tape, which is optically or magnetically recordable and simultaneously, is readable by a machine (e.g., a computer), regardless of whether the software can be deleted or rewritten. It will be appreciated that the method for controlling the apparatus for measuring coordinates of input from an input means according to exemplary embodiments of the present invention may be implemented by a computer or a portable terminal including a controller and a memory, and that the memory is an example of a non-transient machine-readable storage medium suitable for storing a program or programs including instructions for implementing the exemplary embodiments of the present invention. Accordingly, exemplary embodiments of the present invention include a program including codes for implementing an apparatus or a method which is claimed in any claim of this specification, and a storage medium which stores this program and is readable by a machine (a computer or the like).

Also, the apparatus for measuring coordinates may receive and store the program from a device for providing a program, which is connected to the mobile device including the apparatus for measuring coordinates by a wire or wirelessly. The device for providing a program may include: a memory for storing a program including instructions which cause the mobile device to perform a previously-set method for controlling the apparatus for measuring coordinates, information required for the method for controlling the apparatus for measuring coordinates, and the like; a communication unit for performing wired or wireless communication with the mobile device; and a controller for performing a control operation so as to transmit the relevant program to the mobile device, at a request from the apparatus for measuring coordinates or automatically.

According to various exemplary embodiments of the present invention, an apparatus for measuring coordinates and a control method thereof, which can determine a time point of completion of input based on whether a hover event is completed, are provided. When a user inputs handwriting by using a pen, the user does not have to perform handwriting as in the scheme according to the related art in which the user must continuously perform handwriting without hesitation. When the pen is located within a predetermined distance from the apparatus for measuring coordinates, the user can operate the mobile device in such a manner as to prevent the initiation of text recognition. Accordingly, the user can determine a time point of completion of handwriting at a desired time point.

While the invention has been shown and described with reference to certain exemplary embodiments thereof, it will be understood by those skilled in the art that various changes in form and details may be made therein without departing from the spirit and scope of the present invention. Therefore, the spirit and scope of the invention as defined by the appended claims and their equivalents.

What is claimed is:

1. A control method of an apparatus for measuring coordinates of an input by an input means, the control method comprising:
   displaying a user input interface;
   receiving a user input on the user input interface;
   detecting an increase in a distance between the input means and the apparatus for measuring the coordinates;
   comparing a preset length and the distance between the input means and the apparatus for measuring the coordinates in response to the detecting of the increase in the distance;
   displaying the user input interface continuously, while the input means is placed at a position corresponding to a height equal to or less than the preset length;
   determining whether a hover event is completed based on a result of the comparing of the preset length and the distance between the input means and the apparatus for measuring the coordinates;

determining whether a time period of maintaining the completion of the hover event exceeds a preset time period, in response to determining that the hover event is completed; and based on the time period exceeding the preset time period, displaying a result of recognizing the user input as text.

2. The control method as claimed in claim 1, wherein the hover event occurs while the distance between the input means and the apparatus for measuring the coordinates is equal to or less than the preset length.

3. The control method as claimed in claim 2, wherein the determining of whether the hover event is completed comprises:
determining that the hover event is completed when a strength of a reception signal received from the input means is less than a preset strength.

4. The control method as claimed in claim 1, wherein the displaying of the result of recognizing the user input as the text comprises:
simultaneously performing text recognition on the user input; and
displaying a result of performing the text recognition.

5. The control method as claimed in claim 1, wherein the displaying of the result of recognizing the user input as the text comprises:
displaying the user input interface while performing text recognition on the user input even when the hover event is not completed.

6. The control method as claimed in claim 5, wherein the displaying of the result of recognizing the user input as the text comprises:
simultaneously displaying the result of recognizing the user input as the text.

7. The control method as claimed in claim 1, further comprising determining whether the user input is not entered after a preset time period, while the hover event occurs.

8. The control method as claimed in claim 7, wherein the hover event is determined to be completed when the user input is not entered after the preset time period.

9. An apparatus for measuring coordinates of an input by an input means, the apparatus comprising:
a touch screen; and
a controller configured to:
control the touch screen to display a user input interface,
receive a user input on the user input interface,
perform a control operation so as to detect an increase in a distance between the input means and the apparatus for measuring the coordinates,
compare a preset length and the distance between the input means and the apparatus for measuring the coordinates in response to the detecting of the increase in the distance,
display the user input interface continuously, while the input means is placed at a position corresponding to a height equal to or less than the preset length,
determine whether a hover event is completed based on a result comparing of the preset length and the distance between the input means and the apparatus for measuring the coordinates,
determine whether a time period of maintaining the completion of the hover event exceeds a preset time period, in response to determining that the hover event is completed, and
perform a control operation so as to display a result of recognizing the user input as text, based on the time period exceeding the preset time period.

10. The apparatus as claimed in claim 9, wherein the hover event occurs while the distance between the input means and the apparatus for measuring the coordinates is equal to or less than the preset length.

11. The apparatus as claimed in claim 10, wherein the controller determines that the hover event is completed when a strength of a reception signal received from the input means is less than a preset strength.

12. The apparatus as claimed in claim 9, wherein the controller performs a control operation so as to simultaneously perform text recognition on the user input, and so as to display a result of performing the text recognition.

13. The apparatus as claimed in claim 9, wherein the controller performs a control operation so as to display the user input interface while performing text recognition on the user input even when the hover event is not completed.

14. The apparatus as claimed in claim 13, wherein the controller performs a control operation so as to simultaneously display the result of recognizing the user input as the text.

15. The apparatus as claimed in claim 9, wherein the controller determines whether the user input is not entered after a preset time period, while the hover event occurs.

16. The apparatus as claimed in claim 15, wherein the controller determines that the hover event is completed when the user input is not entered after the preset time period.

17. A non-transitory computer-readable storage medium storing instructions that when executed cause at least one processor to perform the method of claim 1.

* * * * *